United States Patent
Komori (10) Patent No.: US 7,915,878 B2
(45) Date of Patent: Mar. 29, 2011

(54) SWITCHING REGULATOR AND METHOD OF CONVERTING DC VOLTAGE

(75) Inventor: Yuri Komori, Kawasaki (JP)

(73) Assignee: Renesas Electronics Corporation, Kanagawa (JP)

(*) Notice: Subject to any disclaimer, the term of this patent is extended or adjusted under 35 U.S.C. 154(b) by 276 days.

(21) Appl. No.: 12/147,885

(22) Filed: Jun. 27, 2008

(65) Prior Publication Data

US 2009/0001949 A1    Jan. 1, 2009

(30) Foreign Application Priority Data

Jun. 27, 2007   (JP) ................... 2007-168760

(51) Int. Cl.
*G05F 1/40* (2006.01)
(52) U.S. Cl. .................................. 323/272
(58) Field of Classification Search .......... 323/271, 323/272, 282; 327/543; 257/365
See application file for complete search history.

(56) References Cited

U.S. PATENT DOCUMENTS

| 7,253,596 B2 * | 8/2007 | Yamamoto et al. | 323/281 |
| 7,262,588 B2 * | 8/2007 | Matsuo et al. | 323/282 |
| 7,348,766 B2 * | 3/2008 | Hachiya et al. | 323/284 |
| 7,450,361 B2 * | 11/2008 | Ito et al. | 361/93.1 |
| 7,538,526 B2 * | 5/2009 | Kojima et al. | 323/225 |
| 7,576,529 B2 * | 8/2009 | Ishino | 323/284 |
| 7,595,624 B2 * | 9/2009 | Tateishi et al. | 323/288 |
| 7,714,560 B2 * | 5/2010 | Fukumori | 323/284 |
| 2009/0201000 A1 * | 8/2009 | Kojima et al. | 323/282 |

FOREIGN PATENT DOCUMENTS

JP    3438330    6/2003

* cited by examiner

*Primary Examiner* — Adolf Berhane
*Assistant Examiner* — Yemane Mehari
(74) *Attorney, Agent, or Firm* — Young & Thompson (57) ABSTRACT

A switching regulator includes an inverter circuit and a size adjustment circuit. The inverter circuit converts an input voltage into an output voltage by a switching operation of a switch circuit. The size adjustment circuit controls an ON resistance of the switch circuit, depending on a power efficiency that is calculated from an input power dependent on the input voltage and an output power dependent on the output voltage.

5 Claims, 9 Drawing Sheets

SWITCHING REGULATOR AND METHOD OF CONVERTING DC VOLTAGE

INCORPORATION BY REFERENCE

This application is based upon and claims the benefit of priority from Japanese patent application No. 2007-168760, filed on Jun. 27, 2007, the disclosure of which is incorporated herein in its entirely by reference.

BACKGROUND OF THE INVENTION

1. Field of the Invention

The present invention relates to a switching regulator and a method of converting a DC voltage.

2. Description of Related Art

A DC-DC converter is a converter circuit for generating a required DC voltage from a given DC voltage, and also referred to as a switching power supply or a switching regulator. A feature of this circuit is to utilize a ratio in time between ON and OFF states of a switch and charge/discharge phenomena of an inductor L and a capacitor C to be able to obtain a desired voltage. While in order to obtain the desired voltage, another power supply circuit converts unnecessary energy into heat to remove it through a resistor, the DC-DC converter segments a power supply voltage by ON/OFF switching of the switch, and utilizes the charge/discharge of the inductor and the capacitor to be able to supply just necessary energy to a load. That is, the DC-DC converter can obtain the desired voltage theoretically without losing energy, and therefore has a feature of higher efficiency (power efficiency) as compared with the other power supply circuit. Note that the efficiency herein is represented by a relationship of a following expression, where the output voltage is a voltage supplied from the DC-DC converter to a load circuit; a load current is a current flowing into the load circuit depending on the output voltage; an input voltage is a power supply voltage converted by the DC-DC converter; and an input current is a current input to the DC-DC converter depending on the input voltage:

Efficiency=((Output voltage×Load current) /(Input voltage×Input current))×100[%]

Figure 1:
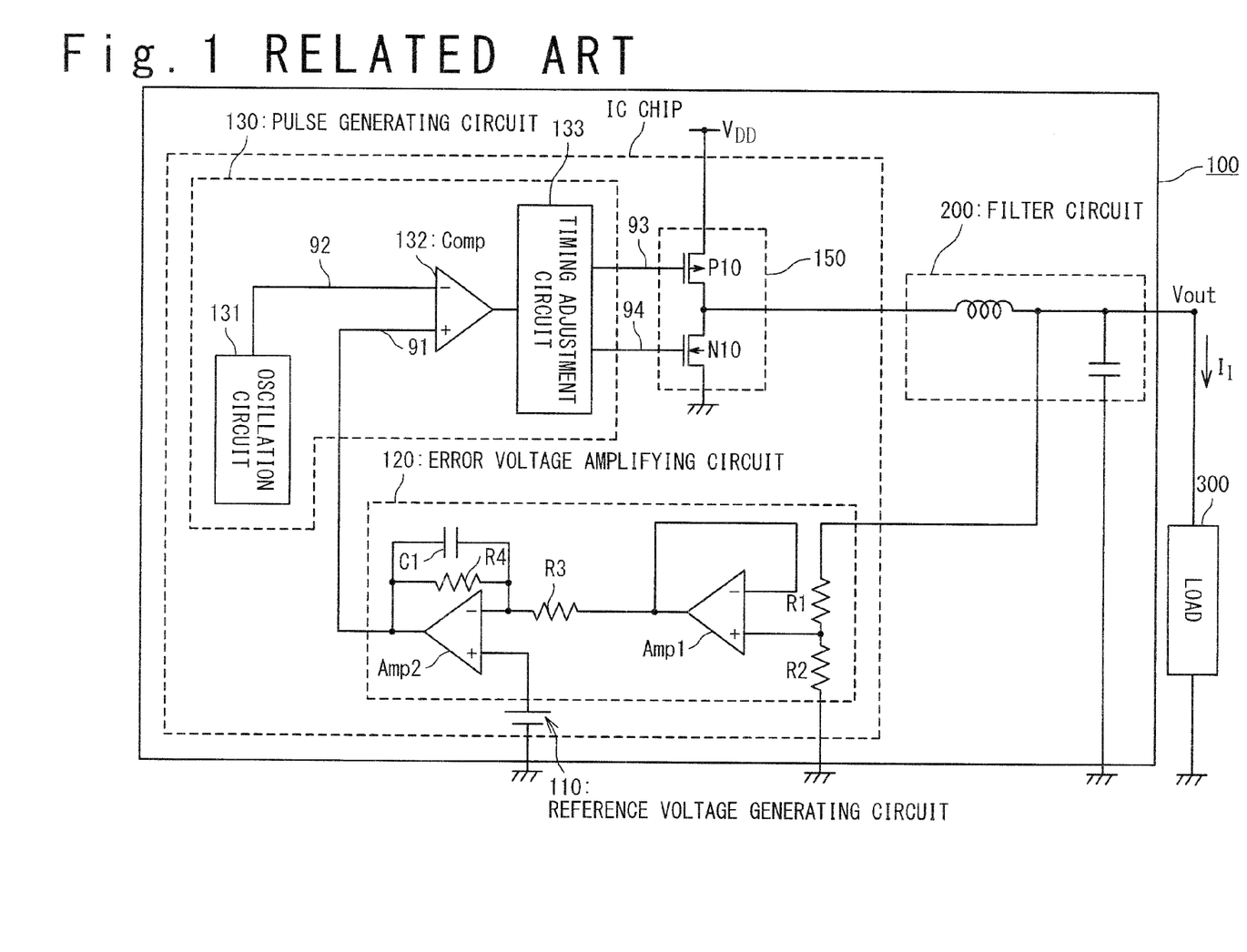
FIG. 1 is a circuit diagram illustrating a configuration of a step-down type synchronous rectification DC-DC converter according to a related technique.
Figure 2:
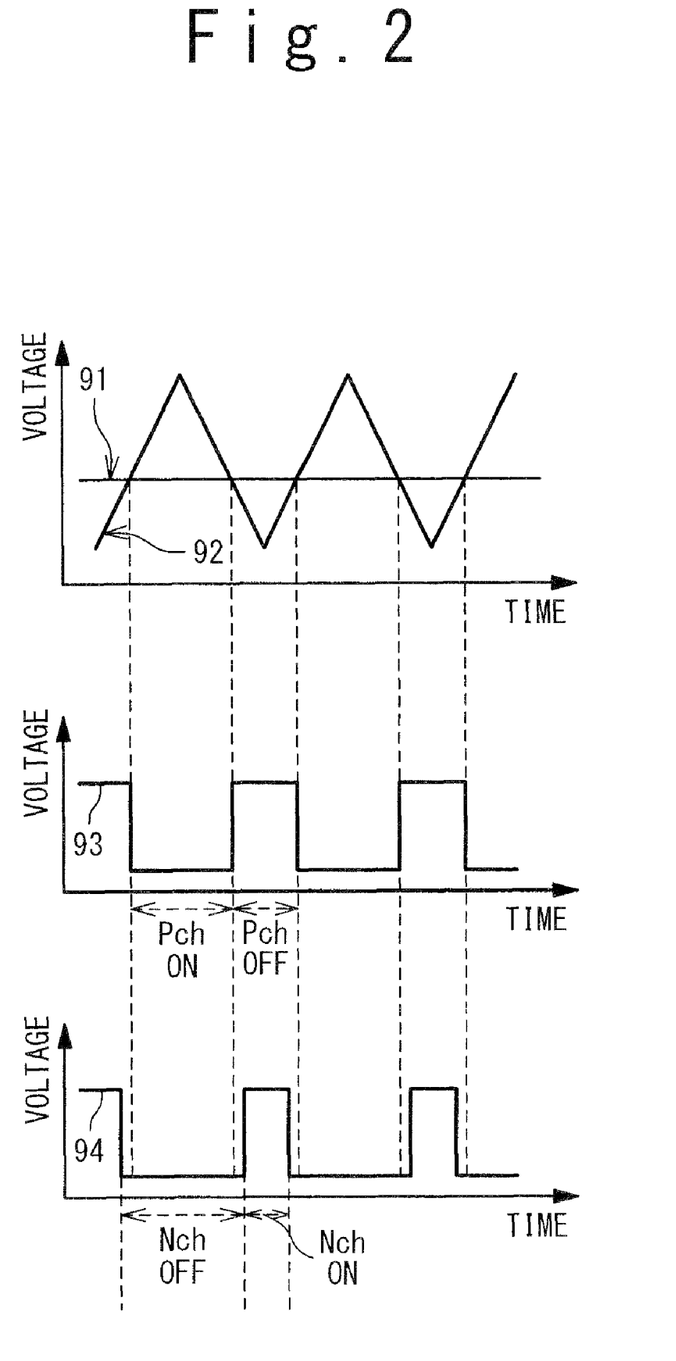
FIG. 2 is a timing chart illustrating input timing of pulse signals input to an inverter circuit.
Figure 3:
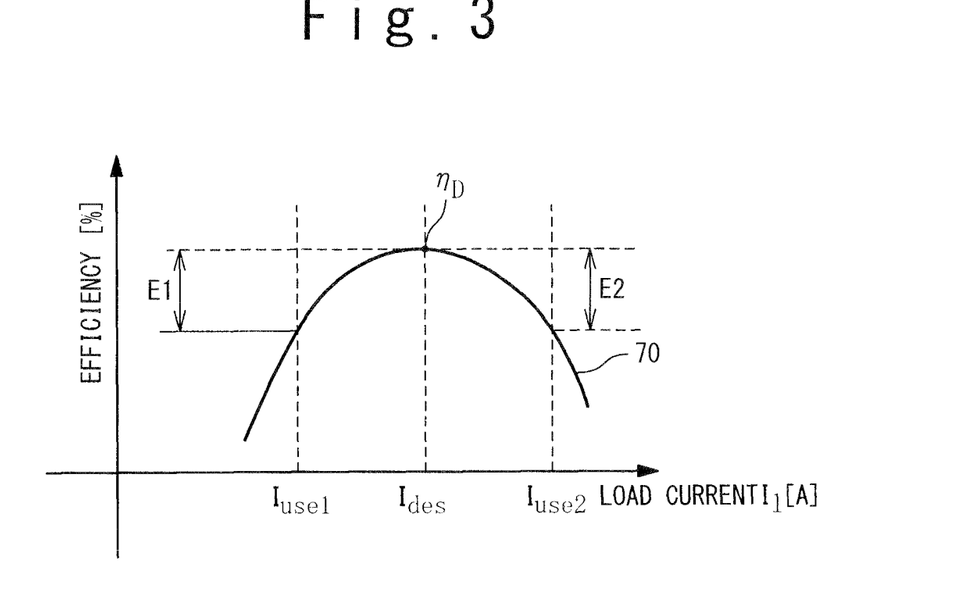
FIG. 3 is a characteristic diagram illustrating an efficiency against a load current in a case of a constant output voltage.

Referring to FIGS. 1 to 3, a circuit configuration and an operating principle of a. synchronous rectification type DC-DC converter is described, which is widely known as one type of the DC-DC converters. FIG. 1 is a circuit diagram illustrating a basic circuit configuration of a step-down type synchronous rectification DC-DC converter. The step-down type synchronous rectification DC-DC converter (hereinafter referred to as a switching regulator 100) includes a reference voltage generating circuit 110, an error voltage amplifying circuit 120, a pulse generating circuit 130, an inverter circuit 150 and a filter circuit 200 The reference voltage generating circuit 110 (e.g., a voltage generating circuit including a regulator), the error voltage amplifying circuit 120, the pulse generating circuit 130 and the inverter circuit 150 are provided on one IC (Integrated Circuit) chip, and connected to a load circuit 300 through the filter circuit 200 formed outside the IC chip.

The inverter circuit 150 includes: a P-channel power MOS transistor P10 (MOS: Metal Oxide Semiconductor) (hereinafter referred to as a PMOS transistor P10); and an N-channel MOS transistor N10 (hereinafter referred to as a NMOS transistor N10), both for switching a power supply voltage VDD to output a pulse voltage. The filter circuit 200 includes an inductor and a capacitor both for smoothing the pulse voltage output from the inverter circuit 150. The error voltage amplifying circuit 120 includes: resistors R1 and R2 for dividing a value of the smoothed output voltage $V_{out}$; a buffer Amp1 for feeding back a voltage divided by the resistors to the switching regulator 100; and an error amplifier Amp2 for amplifying a difference between a reference voltage supplied from the reference voltage generating circuit 110 and the voltage into which the output voltage $V_{out}$ is divided by the resistors Note that the error amplifier Amp2 is connected with resistors R3 and R4 operating as attenuators. An output from the buffer Amp1 is supplied to the error amplifier Amp2 through the resistor R3. An output signal 91 of the error amplifier Amp2 is fed back to itself through a capacitor C1 and the resistor R4 connected in parallel to each other, as well as being supplied to the pulse generating circuit 130. The pulse generating circuit 130 includes: an oscillation circuit 131 for outputting an output signal 92 for determining a switching period of the inverter circuit 150; a comparator 132 for comparing the output signal 91 of the error amplifier Amp2 and the output signal 92 of the oscillation circuit 131 with each other; and a timing adjustment circuit 133 for adjusting timing of an output (pulse signal) from the comparator 132 to output it to the inverter circuit 150 as pulse signals 93 and 94.

Now, referring also to FIG. 2, operations of the switching regulator 100 are described. The timing adjustment circuit 133 adjusts signal levels of the pulse signals 93 and 94 to be output to the inverter circuit 150, according to a result of the comparison between the output signal 91 dependent on the output voltage $V_{out}$ and the output signal 92 from the oscillation circuit 131. For example, referring to FIG. 2, if a voltage value of the output signal 92 is larger than that of the output signal 91, a signal level of the pulse signal 93 is brought to a Low level. At this time, the PMOS transistor P10 is turned ON. On the other hand, if the voltage value of the output signal 92 is smaller than that of the output signal 91, the signal level of the pulse signal 93 is brought to a High level. At this time, the PMOS transistor P10 is turned OFF. In this manner, the timing adjustment circuit 133 changes the signal level of the pulse signal 93 according to a period of the output signal 92 to control ON/OFF (switching) of the PMOS transistor P10. Similarly, the timing adjustment circuit 133 changes a signal level of the pulse signal 94 according to the period of the output signal 92 to control ON/OFF (switching) of the NMOS transistor N10. Note that if a value of the output voltage $V_{out}$ increases, the voltage value of the output signal 91 is increased, so that an ON time of the PMOS transistor P10 becomes shorter, whereas an ON time of the NMOS transistor N10 becomes longer. On the other hand, if the value of the output voltage $V_{out}$ decreases, a similar feedback is performed such that a ratio in time of the switching (ratio in ON/OFF time between the PMOS transistor P10 and the NMOS transistor N10) is changed in the opposite direction.

Note that if there is no timing adjustment circuit 133 and therefore the output of the comparator 132 is output to the inverter circuit 150 without change, a time period for which the PMOS transistor P10 and the NMOS transistor N10 are simultaneously in the ON states arises, and a through current flows during the time period. The through current is s a significant factor causing a reduction in efficiency upon driving of the switching regulator 100. For this reason, it is effective to provide the timing adjustment circuit 133 between the output of the comparator 132 and the inverter circuit 150. As shown in FIG. 2, the timing adjustment circuit 133 finely adjusts pulse widths such that the PMOS transistor P10 and the NMOS transistor N10 are not simultaneously brought into the ON states.

Meanwhile, one of the factors affecting the efficiency of the switching regulator 100 lies in MOS sizes (ON resistances) of the PMOS transistor P10 and the NMOS transistor N10 in the inverter circuit 150. The MOS sizes and ON resistances of the PMOS transistor P10 and the NMOS transistor N10 in the inverter circuit 150 are hereinafter simply referred to as MOS sizes and ON resistances. The inverter circuit 150 has heat loss due to a load current $I_l$ flowing through the load circuit and a transient loss due to parasitic capacitance, and therefore the appropriate MOS sizes exhibit different values depending on an operating condition. For this reason, the efficiency in a case where the load current $I_l$ is changed under a condition of the output voltage $V_{out}$ being constant is, as illustrated in FIG. 3, changed so as to draw a load curve 70 having a peak (optimum efficiency $\eta_D$). For example, if the MOS sizes are designed to achieve the optimum value (efficiency $\eta_D$) at a load current $I_{des}$, connecting the load circuit 300 causing the load current $I_l$ different from the load current $I_{des}$ to the switching regulator results in a reduction in the efficiency. This is because a load current different from the optimum load current $I_{des}$ causes the reduction in the efficiency due to the ON resistances and parasitic capacitance in the inverter circuit 150. For example, if the load current $I_l$ is $I_{use1}$ smaller than the load current $I_{des}$, the efficiency is reduced depending on switching loss, resulting in a value lower than the efficiency $\eta_D$ by E1. On the other hand, if the load current $I_l$ is $I_{use2}$ larger than the load current $I_{des}$, the efficiency is reduced depending on the ON resistances, resulting in a value lower than the efficiency $\eta_D$ by E2.

For these reasons, in order to drive the switching regulator at a peak (maximum value) of the efficiency curve, it is important to set the MOS sizes (ON resistances) optimized for every use condition such as the load current $I_l$ or the output voltage $V_{out}$.

The switching regulator is widely used for portable devices such as battery-driven digital cameras and cellular phones, and devices requiring low power consumption. For this reason, the switching regulator having a high efficiency to extend an operating time as much as possible is required. Control of the ON resistance (MOS size) dominating the efficiency is an important element for driving the switching regulator at the peak of the efficiency curve. Japanese Patent No. 3438330 describes a power supply apparatus (DC-DC converter) in which an ON resistance of a transistor is controlled to improve efficiency.

The power supply apparatus described in Japanese Patent No. 3438330 includes: a plurality of parallely connected switch elements (equivalent to the PMOS transistor P10 or the NMOS transistor N10 in FIG. 1) for generating a pulse signal depending on an output voltage; and a switch element selection circuit for selecting from the plurality of switch elements one to which the pulse signal is input, on the basis of the output voltage (or any of a reference voltage, an output current and an output power). The plurality of switch elements include ones having small ON resistance and ones having small parasitic capacitance. The switch element selection circuit selects one of the two types of switch elements according to a result of comparison between the output voltage and a threshold voltage. Based on this, the power supply apparatus described in Japanese Patent No. 3438330 selectively uses the switch elements having small parasitic capacitance or those having small ON resistance and large parasitic capacitance, depending on the output voltage, to perform voltage conversion.

With decreasing the ON resistance of the switch element (i.e., with increasing the MOS size), steady power consumption (loss) for a load of the switch element is decreased, and therefore a high efficiency can be obtained. Whereas, with decreasing the ON resistance of the switch element (with increasing the MOS size), the parasitic capacitance is increased. For these reasons, a difference in a transition period of a signal level arises between cases of the large and small ON resistances of the switching element. If the transition period becomes longer, a switching loss (transient loss) becomes larger and therefore the efficiency is reduced in a case of a small output voltage. According to Japanese Patent No. 3438330, the switching regulator (power supply apparatus) of a variable output voltage type can efficiently perform a voltage conversion by switching to the switch element having the appropriate ON resistance with respect to each output voltage.

The inventor of the present application has recognized the following point.

According to the power supply apparatus described in Japanese Patent No. 3438330, a switch element (ON resistance value) is selected depending on a result of the comparison between a predetermined threshold voltage and the output voltage. That is, a switch element (ON resistance value) to be selected for every predetermined threshold voltage is fixed. The load current $I_l$ upon voltage conversion does not necessarily coincide with the load current $I_{des}$ corresponding to the selected switch element. In such a case, the efficiency of the power supply apparatus comes to a value lower than the optimum value (efficiency $\eta_D$) as described above. The efficiency curve 70 shown in FIG. 3 also depends on values of a coil and a capacitor (e.g., the filter circuit 200 in FIG. 1) attached outside an IC chip, besides a characteristic (ON resistance value) of the switch element. For this reason, in a case where the switch element (ON resistance value) to be selected for every operating condition (threshold voltage) is fixed as in Japanese Patent No. 3438330, the outside parts should be replaced to perform the voltage conversion at the optimum efficiency $\eta_D$.

SUMMARY

In one embodiment of the present invention, a switching regulator is provided. The switching regulator includes an inverter circuit and a size adjustment circuit. The inverter circuit converts an input voltage into an output voltage by a switching operation of a switch circuit. The size adjustment circuit controls an ON resistance of the switch circuit depending on a power efficiency that is calculated from an input power dependent on the input voltage and an output power dependent on the output voltage.

In another embodiment of the present invention, a method of converting a DC voltage is provided. The method includes: setting an ON resistance of a switch circuit depending on a power efficiency that is calculated from an input power dependent on an input voltage and an output power dependent on an output voltage; and converting the input voltage into the output voltage by a switching operation of the switch circuit.

According to the embodiments of the present invention, the size of the switch circuit that performs the voltage conversion is adjusted based on the power efficiency at the time of the voltage conversion. Even if a load current different from that envisaged at a design stage flows, the size of the switch circuit can be adjusted to achieve the optimum efficiency. It is therefore possible to suppress power consumption at the time of DC voltage conversion.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed. Embodiments of the present invention will hereinafter be described referring to accompanying drawings. In the drawings, same or similar reference numerals indicate same, similar, or equivalent components.
(Configuration)

Figure 5:
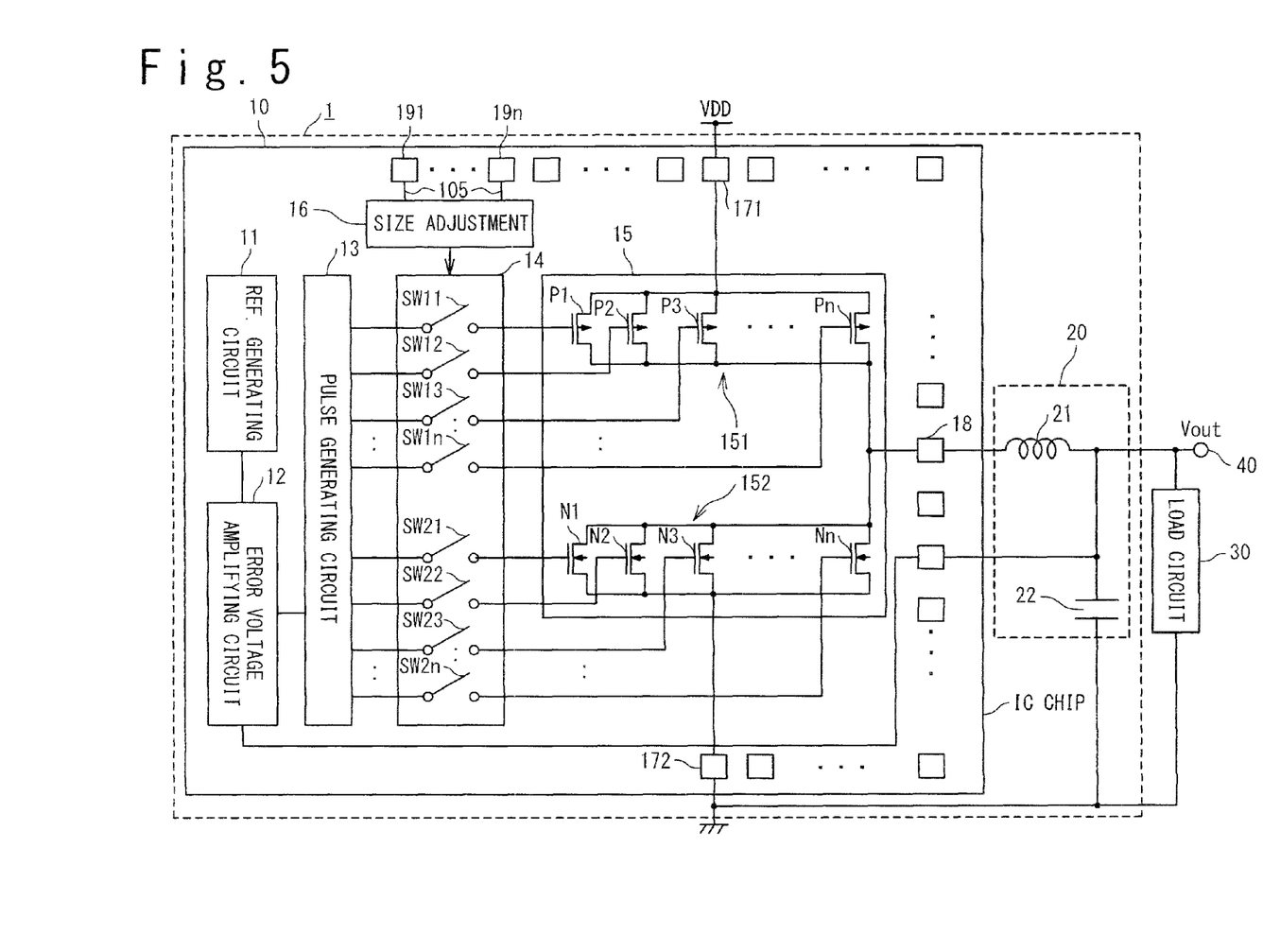
FIG. 5 is a configuration diagram illustrating a switching regulator (DC-DC converter) according to an embodiment of the present invention.

FIG. 5 is a diagram illustrating a configuration of a switching regulator 1 according to an embodiment of the present invention. The switching regulator 1 according to the present embodiment includes a voltage conversion circuit 10 formed on an IC chip and a filter circuit 20 provided outside the IC chip. The voltage conversion circuit 10 is connected to an output terminal 40 through the filter circuit 20. The voltage conversion circuit 10 converts an input voltage (power supply voltage VDD-ground voltage GND) into an output voltage $V_{out}$ by a switching operation, and supplies the output voltage $V_{out}$ to a load circuit 30 through the output terminal 40. The voltage conversion circuit 10 includes a reference voltage generating circuit 11, an error voltage amplifying circuit 12, a pulse generating circuit 13, a switch circuit section 14, an inverter circuit 15 and a size adjustment circuit 16.

The reference voltage generating circuit 11, the error voltage amplifying circuit 12, the pulse generating circuit 13, the filter circuit 20 and the load circuit 30 have similar configurations of the reference voltage generating circuit 110, the error voltage amplifying circuit 120, the pulse generating circuit 130, the filter circuit 200 and the load circuit 300 shown in FIG. 1, respectively, and therefore detailed descriptions of them are omitted.

The pulse generating circuit 13 according to the present embodiment is connected to the inverter circuit 15 through the switch circuit section 14. The inverter circuit 15 converts the input voltage into the output voltage by a switching operation. More specifically, the inverter circuit 15 includes a switch circuit 151 having a plurality of PMOS transistors P1 to Pn (switch elements) and a switch circuit 152 having a plurality of NMOS transistors N1 to Nn (switch elements). Sources of the PMOS transistors P1 to Pn are connected to the power supply VDD through an external terminal 171. On the other hand, sources of the NMOS transistors N1 to Nn are connected to a ground voltage GND through an external terminal 172. Also, drains of the PMOS transistors P1 to Pn and the NMOS transistors N1 to Nn are connected with each other and also connected to the filter circuit 20 through an external terminal 18. Pulse signals output from the pulse generating circuit 13 are input through the switch circuit section 14 to respective gates of the PMOS transistors P1 to Pn and the NMOS transistors N1 to Nn. The switch circuits 151 and 152 constitute an inverter circuit, which segments the input voltage dependent on the power supply voltage VDD and the ground voltage GND by the switching operation in accordance with the pulse signal and outputs the segmented voltage to the filter circuit 20.

The switch circuit section 14 includes a plurality of switches SW11 to SW1$n$ and SW21 to SW2$n$ of which the switching operations are controlled by the size adjustment circuit 16. The switches SW11 to SW1$n$ respectively control electrical connections between the gates of the PMOS transistors P1 to Pn and a timing adjustment circuit (equivalent to the timing adjustment circuit 133 in FIG. 1) included in the pulse generating circuit 13. On the other hand, the switches SW21 to SW2$n$ respectively control electrical connections between the gates of the NMOS transistors N1 to Nn and the timing adjustment circuit included in the pulse generating circuit 13. The size adjustment circuit 16 controls the switching operations (ON/OFF) of the switches SW11 to SW1$n$ and SW21 to SW2$n$ in the switch circuit section 14 to select switch element (MOS transistor) in the inverter circuit 15 to be used for the voltage conversion. For example, if the PMOS transistors P1 to P4 and the NMOS transistors N1 to N4 in the inverter circuit 15 are selectively used, the size adjustment circuit 16 outputs a corresponding control signal to the switch circuit section 14 and the switch circuit section 14 turns ON the switches SW11 to SW14 and SW21 to SW24 while turns OFF the other switches in response to the control signal. Consequently, an inverter circuit constituted by the switch elements (MOS transistors) P1 to P4 and N1 to N4 is driven by a pulse signal output from the pulse generating circuit 13.

Figure 6:
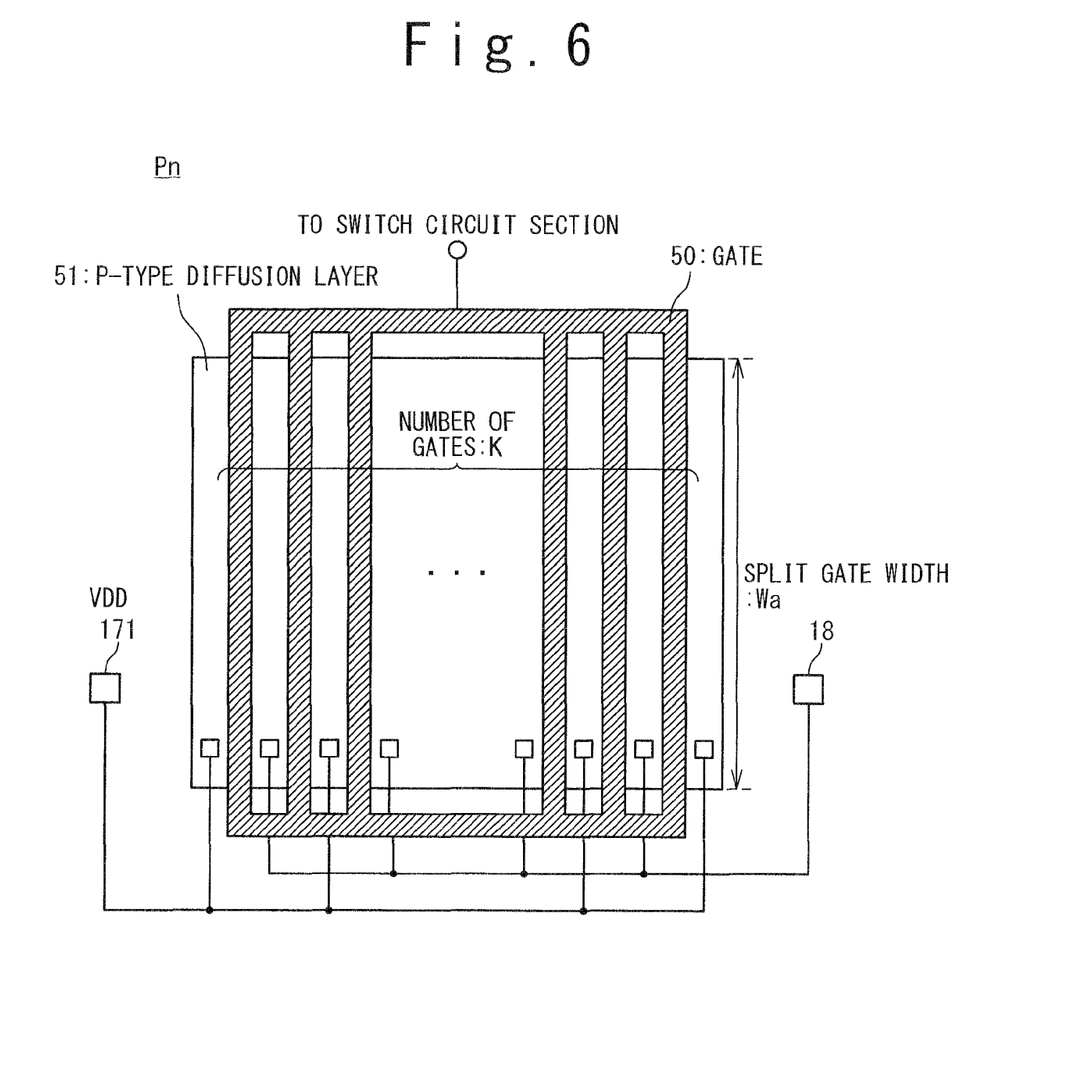
FIG. 6 is a plan view illustrating a structure of a switch element according to the present embodiment.

Note that respective gate sizes W of the plurality of PMOS transistors P1 to Pn are proportional to powers of 2. FIG. 6 illustrates a structure of the PMOS transistor Pn. Referring to FIG. 6, the PMOS transistor Pn is formed on a P-type diffusion layer 51, and includes a gate line 50 connected to (the switch SW1$n$ of) the switch circuit section 14. The gate line 50 is split into K lines, and a source diffusion region and a drain diffusion region are provided on both sides of each split gate line. The source diffusion regions are connected to the external terminal 171, and the drain diffusion regions are connected to the external terminal 18. Given that a gate width (split gate width) on the P-type diffusion layer 51 is Wa, the gate size W of the PMOS transistor Pn becomes K×Wa. Note that the number of gate lines K takes a value proportional to a power of 2 ($2^{n-1}$×H: n is an integer equal to or larger than 1, and H is a coefficient). The other PMOS transistors P1 to Pn-1 have similar structures, wherein the number of gate lines K depends on a value of n. For example, the numbers of gate lines K of the PMOS transistors P1 to P4 come to H, 2×H, 4×H, and 8×H, respectively. For this reason, if the split gate widths Wa of the PMOS transistors are the same, the gate sizes W of the PMOS transistors P1 to Pn are weighted in proportion to powers of 2, respectively. Similarly, gate sizes W of the NMOS transistors N1 to Nn are also weighted in proportion to the powers of 2, respectively. Note that we assume that the split gate widths have a same size.

Figure 7:
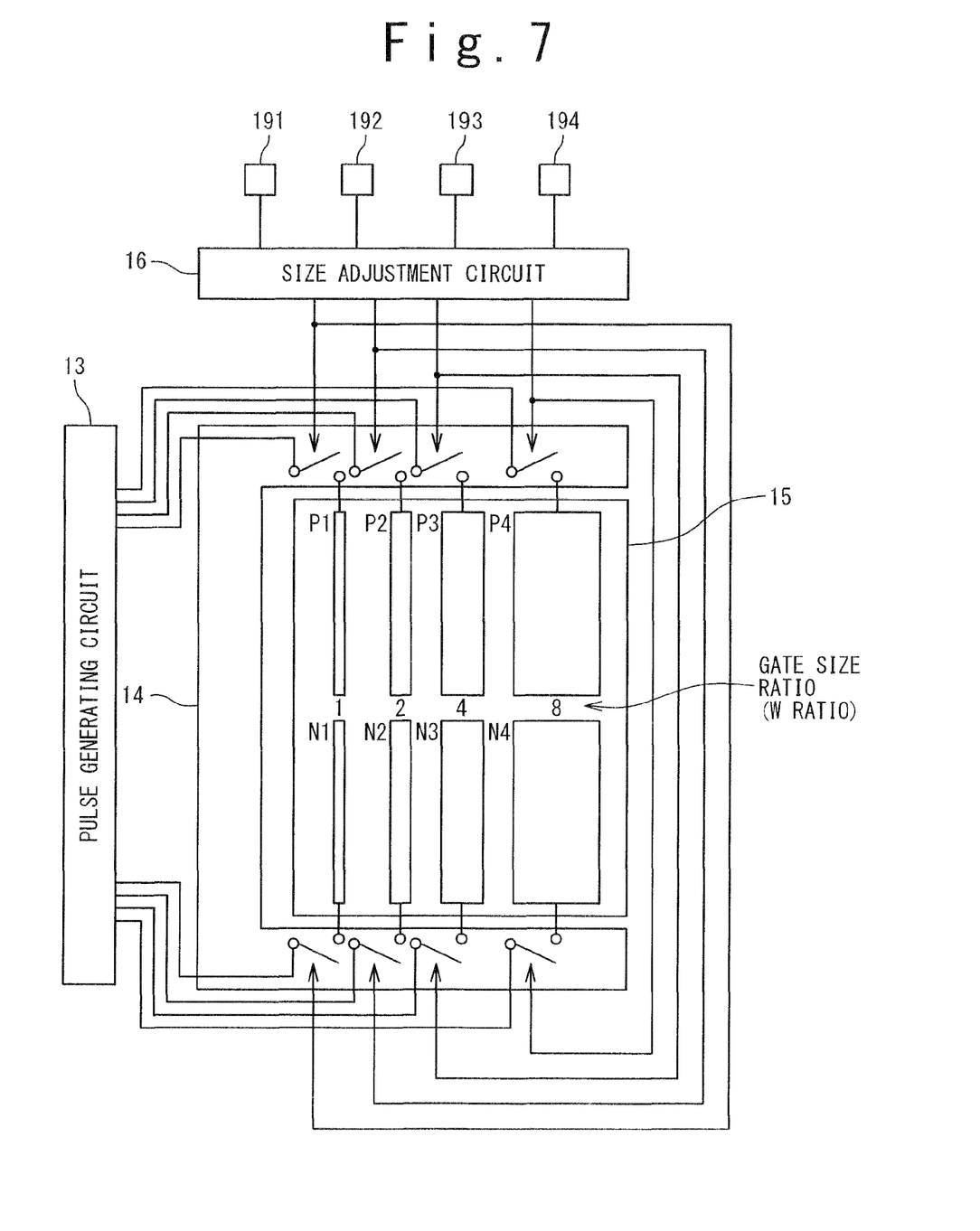
FIG. 7 is a block diagram for explaining weighting of gate sizes of switch elements in an inverter circuit according to the present embodiment.

Referring to FIG. 7, a MOS size in the inverter circuit 15 is described. The MOS size in this description indicates a sum of the gate sizes W of the PMOS transistors (or NMOS transistors) in the inverter circuit 15 that are connected to the pulse generating circuit 13. That is, the MOS size determines the ON resistance of the switch circuit 151 (or 152). As an example, let us consider a case where the inverter circuit 15 includes the PMOS transistors P1 to P4 among which gate size ratio (W ratio) is 1:2:4:8 and the NMOS transistors N1 to N4 among which gate size ratio is also 1:2:4:8. The size adjustment circuit 16 controls the switch circuit section 14 by the control signal to select a selected number of switch elements (MOS transistors) in the inverter circuit 15 which are to be connected to the pulse generating circuit 13. In this case, the number of combinations of the MOS transistors to be selected becomes fifteen, i.e., from a combination of the PMOS transistor P1 and the NMOS transistor N1 only (minimum MOS size=1×H×Wa) to a combination of all of the MOS transistors (maximum MOS size=(1+2+4+8)×H×Wa). Also, a step size of the MOS size is 1×H×Wa. For example, given that the minimum gate size is 1 mm, the MOS size of the MOS transistors to be driven can be changed from 1 mm to 15 mm on the 1 mm basis. The PMOS transistors P1 to Pn (or NMOS transistors N1 to Nn) in the inverter circuit 15 are preferably set such that the respective numbers of the split gates are proportional to powers of 2. As a result, relative accuracy among the respective gate widths becomes very high, the step size of the MOS size becomes accurate, and therefore an accurate ON resistance adjustment can be achieved.

Also, regarding the number of switches SW necessary for adjusting the MOS size (ON resistance), n pieces of switches are provided for the n pieces of PMOS transistors P1 to Pn, and another n pieces of switches for the n pieces of NMOS transistors N1 to Nn. According to the present embodiment, the n pieces of switches SW1 to SWn enable the MOS size (ON resistance value) to be changed to any of $2^n-1$ different sizes. In other words, the MOS size (ON resistance) can be changed to a large variety of sizes at a small interval by a small number of switches. For example, according to the power supply apparatus described in Japanese Patent No. 3438330, switches for selecting the switch elements should be provided as many as the number of conditions (threshold voltages) for determining the ON resistance value, which may cause an increase in area. According to the present embodiment, the number of switches can be reduced as compared with the number of the available MOS sizes, so that a chip area can be decreased. Also, according to the present embodiment, the gate sizes W of the PMOS transistors P1 to Pn (NMOS transistors N1 to Nn) are weighted by magnitudes proportional to the powers of 2, respectively. Therefore, the MOS size (efficiency) can be adjusted by a binary control signal. For example, in the case of adjusting the MOS size of the PMOS transistors P1 to Pn and the NMOS transistors N1 to Nn, the MOS size can be adjusted by an n-bit control signal. That is to say, the efficiency can be adjusted in a manner similar to a digital control. Note that the ratio among the gate sizes W is not limited to the powers of 2 but may be powers of 3, 4 or the like. Although a control method becomes complicated in this case as compared with the case of the powers of 2, the number of switches for adjusting the MOS size can be reduced as compared with the related technique. Furthermore, according to the present embodiment, the gate sizes W in each of the switch circuits 151 and 152 have a mutually proportional relationship, respectively, so that the change interval of the MOS size is uniform. For this reason, the efficiency (power efficiency) can be finely adjusted with accuracy.

Referring back to FIG. 5, the size adjustment circuit 16 controls the switch circuit section 14 in response to an external input signal (size setting signal 105) input through external terminals 191 to 19n. The size setting signal 105 corresponds to the MOS size (ON resistance) to be set. The number of the external terminals 191 to 19n is appropriately changed depending on an accuracy of the size adjustment. If the number of size adjustments is $2^n$, the ON resistance value to be set for the inverter circuit 15 is adjusted on the basis of the n-bit size setting signal 105 input from the n pieces of external terminals 191 to 19n. For example, if the MOS size is changed to any of the fifteen different sizes as described above, the 4-bit size setting signal 105 is input from the four external terminals 191 to 194. When controlling the switch circuit section 14, the size adjustment circuit 16 may use the received size setting signal 105 as the control signal without modification or may use a new pattern signal generated from a use condition and the size setting signal 105 as the control signal.

Note that the external terminals 191 to 19n are pads formed on the same IC chip as for the voltage conversion circuit 10. For this reason, the MOS size (ON resistance) of the switch elements (PMOS transistors P1 to Pn and NMOS transistors N1 to Nn) in the inverter circuit 15 can be set in accordance with the externally input size setting signal 105, without changing a circuit configuration outside the IC chip. The size adjustment circuit 16 may be a PROM (Programmable Read Only Memory) rewritable by a ROM code, or a fuse ROM (Read Only Memory) fixedly setting a determined MOS size. If the size adjustment circuit 16 is rewritable by the ROM code, various MOS sizes can be set depending on a use environment of the switching regulator. For example, if a use condition of the switching regulator varies, or one would like to change the optimum efficiency at an evaluation stage (selection of outside parts, etc.), it is effective to use the PROM that can change the binary pattern. On the other hand, if the MOS size is set so as to obtain the optimum efficiency under a condition that the load and the power supply voltage upon use are fixed, it is effective to use the fuse ROM.

(Method of Optimizing MOS Size (ON Resistance))

Figure 8:
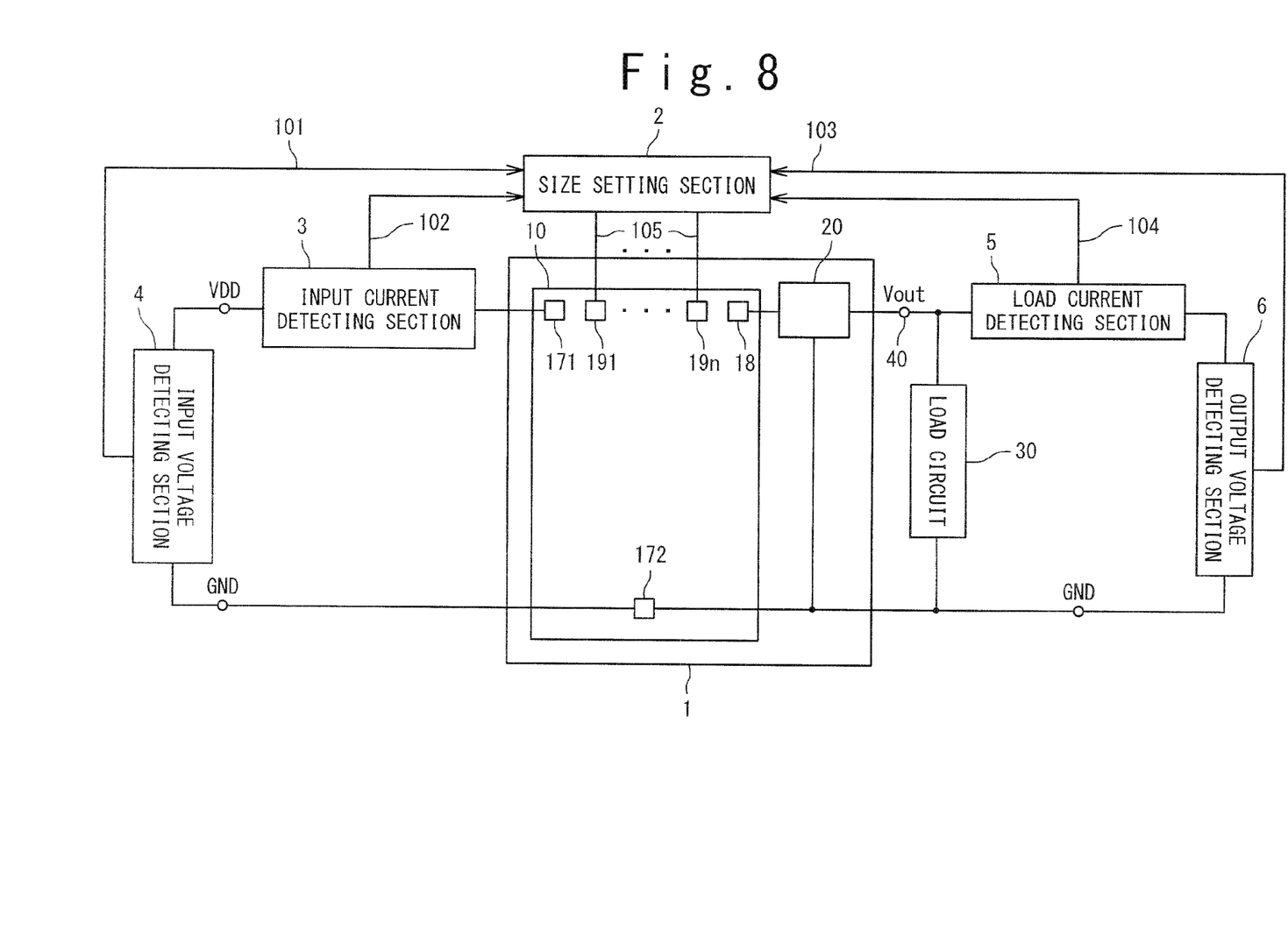
FIG. 8 is a block diagram illustrating a configuration upon setting of a MOS size (ON resistance) of the inverter circuit in the present embodiment.
Figure 9:
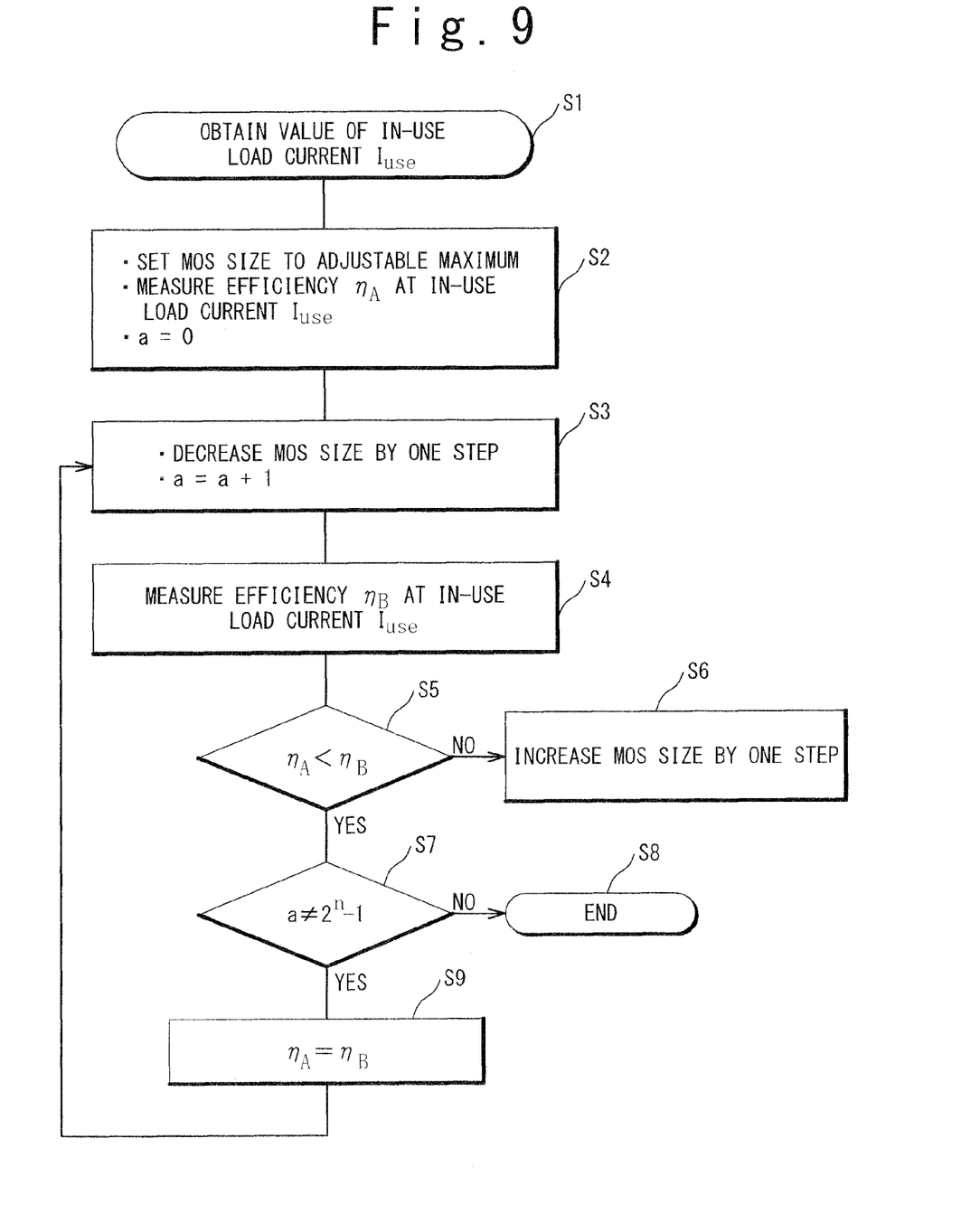
FIG. 9 is a flowchart illustrating an operation of optimization processing of the MOS size (ON resistance) according to the present embodiment.
Figure 10:
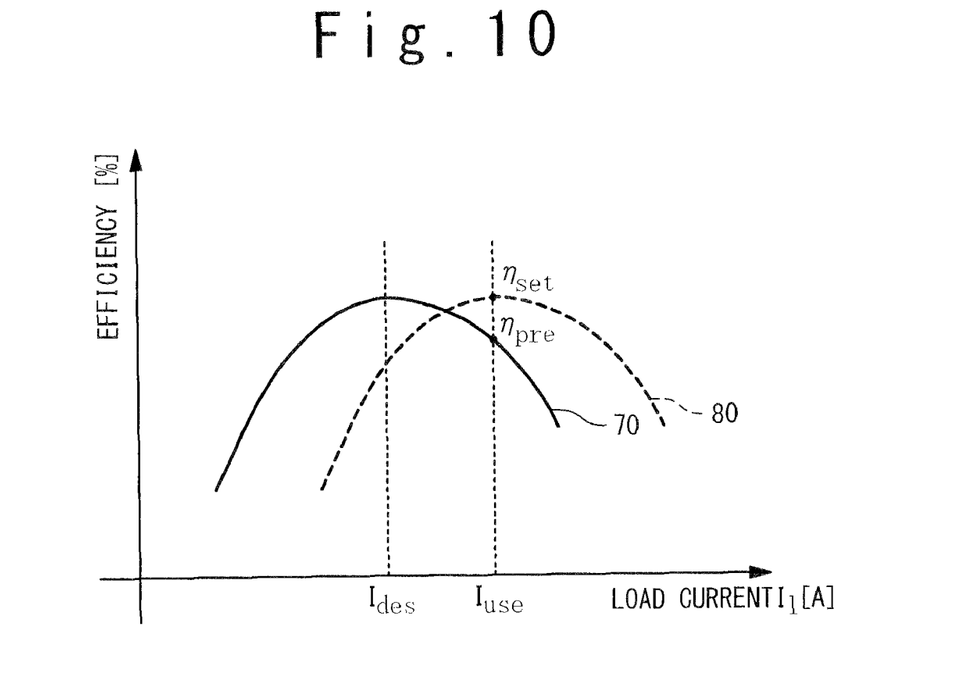
FIG. 10 is a characteristic diagram illustrating a variation in an efficiency curve in the optimization processing of the MOS size (ON resistance) according to the present embodiment.

Next, optimizing the MOS size (ON resistance) of the switch elements in the inverter circuit 15 according to the present embodiment will be described with reference to FIGS. 8 to 11. FIG. 8 is a block diagram illustrating a configuration upon setting of the MOS size of the switch elements in the inverter circuit 15 according to the present embodiment. FIG. 9 is a flowchart showing an operation for setting the MOS size of the switch elements in the inverter circuit 15 according to the present embodiment.

Referring to FIG. 8, the external terminals 191 to 19n of the voltage conversion circuit 10 are connected to a size setting section 2 for outputting the size setting signal 105. The external terminal 171 supplied with the power supply voltage VDD is connected to an input current detecting section 3. The input current detecting section 3 measures an input current 102 input to the switching regulator 1 according to an input voltage, and outputs the measured input current 102 to the size setting section 2. An input voltage detecting section 4 is provided between a terminal for the power supply (VDD) and a terminal for ground (GND). The input voltage detecting section 4 outputs a voltage difference between the power supply voltage (VDD) and the ground voltage (GND) as an input voltage 101 to the size setting section 2. The output terminal 40 from which the output voltage $V_{out}$ is output is connected to a load current detecting section 5. The load current detecting section 5 measures a load current 104 output from the switching regulator 1, and outputs the measured load current 104 to the size setting section 2. An output voltage detecting section 6 is provided between the ground terminal (GND) and the output terminal 40 from which the output voltage $V_{out}$ is output. The output voltage detecting section 6 outputs a voltage difference between the output voltage $V_{out}$ and the ground voltage GND as an output voltage 103 to the size setting section 2.

The size setting section 2 calculates the efficiency by using the input voltage 101, the input current 102, the output voltage 103 and the load current 104, and outputs the size setting signal 105 depending on the calculated efficiency to the switching regulator 1. Note that the efficiency is calculated on the basis of ((Output voltage×Load current)/(Input voltage×Input current))×100[%]. The size setting section 2 preferably converts the calculated efficiency into a binary signal to output it as the size setting signal 105. At this time, the n-bit signal corresponding to the number n of switch elements (transistors) in the switch circuit 151 or 152 shown in FIG. 5 is preferably output. Note that, if the efficiency is calculated under a condition of the input voltage 101 and output voltage 103 being constant, the input voltage detecting section 4 and the output voltage detecting section 6 may not be provided.

If the switching regulator 1 designed to have the optimum efficiency at the load current $I_{des}$ is used with being connected to the load circuit 30 causing a load current $I_{use}$, the efficiency is reduced as compared with the optimum value. For example, if the MOS size of the switch elements is set to exhibit the efficiency curve 70 shown in FIG. 10, the efficiency becomes $\eta_{pre}$ at the load current upon use (in-use load current $I_{use}$), which is lower than the optimum efficiency (the maximum value of the efficiency curve 70). According to the MOS size setting method in the present embodiment, changing of the MOS size and the measurement of the efficiency are repeated until the efficiency at the in-use load current $I_{use}$ reaches the maximum value $\eta_{set}$ of the efficiency curve. Consequently, the most efficient MOS size (ON resistance) at the in-use load current $I_{use}$ can be determined. The efficiency characteristic of the switching regulator 1 in which the MOS size is set in this manner is expressed by an efficiency curve 80 in FIG. 10 having the maximum value (efficiency $\eta_{set}$) at the in-use Load current $I_{use}$.

Referring to FIG. 9, the operation for setting the MOS size of the switch elements in the inverter circuit 15 according to the present embodiment is described in detail. First, the size setting section 2 obtains the in-use load current $I_{use}$ from the load current detecting section 5 (Step S1). The size setting section 2 calculates an efficiency at the in-use load current $I_{use}$ with the MOS size being set to an adjustable maximum, and represents it as an efficiency $\eta_A$ (Step S2). More specifically, the size setting section 2 outputs the size setting signal 105 corresponding to a condition that all of the switches SW11 to SW1n and SW21 to SW2n in the switch circuit section 14 are turned ON. In response to the size setting signal 105, the size adjustment circuit 16 controls the switch circuit section 14 to turn ON all of the switches SW11 to SW1n and SW21 to SW2n. The size setting section 2 calculates the efficiency by using the input voltage 101, the input current 102, the output voltage 103 and the load current 104 under the condition of the maximum MOS size. At this time, the calculated efficiency $\eta_A$ is set in the size setting section 2. Moreover, the number of size adjustment times "a" is set to 0 (a=0).

Next, the size setting section 2 decreases the MOS size by one step and increases the number of size adjustment times "a" by one (Step S3). For example, after the MOS size has been set to the maximum size $(2^n-1)\times H \times Wa$, the size setting section 2 outputs to the size adjustment circuit 16 the size setting signal 105 with which the MOS size is changed to $(2^n-2)\times H \times Wa$. The size adjustment circuit 16 controls the switch circuit section 14 in response to the size setting signal 105 to change the MOS size. After the MOS size is changed, the size setting section 2 again calculates an efficiency at the in-use load current $I_{use}$, and represents it as an efficiency $\eta_B$ (Step S4). Then, the size setting section 2 compares the calculated efficiencies $\eta_A$ and $\eta_B$. If the efficiency $\eta_B$ is equal to or lower than the efficiency $\eta_A$ (Step S5: No), the size setting section 2 increases the MOS size by one step, and ends the processing (Step S6). That is, if the efficiency $\eta_B$ is equal to or lower than the efficiency $\eta_A$, the MOS size before the decrease at Step 3 is set as the optimum size for the in-use load current $I_{use}$. On the other hand, if the efficiency $\eta_B$ is higher than the efficiency $\eta_A$ (Step S5: Yes), the size setting section 2 checks whether or not the number of size adjustment times "a" has reached the number of available sizes "$2^n-1$" (Step S7). If the number of size adjustment times "a" has reached the number of available sizes "$2^n-1$" (Step S7: No), the size setting section 2 ends the processing (Step S8). On the other hand, if the number of size adjustment times "a" has not reached the number of available sizes "$2^n-1$" (Step S7: Yes), the size setting section 2 sets the above-mentioned efficiency $\eta_B$ as a new efficiency $\eta_A$ (Step S9). Then, the processing returns back to the above-mentioned Step S3. In this manner, the size setting section 2 repeatedly calculates the efficiency with decreasing the MOS size one step by one step, as long as the relationship of $\eta_A<\eta_B$ continues.

To avoid deficiency in driving capability of the inverter circuit 15 with respect to the load current (in-use load current $I_{use}$), the size adjustment is preferably started from the maximum MOS size. Consequently, it is possible to adjust the MOS size to an optimum MOS size (ON resistance value) without causing the deficiency in the driving capability with respect to the load current. It should be noted that if the driving capability of the inverter circuit 15 is sufficient, the MOS size at the start of the size adjustment may be set to any size.

When a MOS size for achieving the optimum efficiency at the load current $I_{use}$ is determined, the MOS size is fixedly or rewritably set in the size adjustment circuit 16. The size adjustment circuit 16 controls the switch circuit section 14 by a control signal corresponding to the set MOS size (ON resistance) to change the MOS size of the inverter circuit 15 in use.

Figure 11:
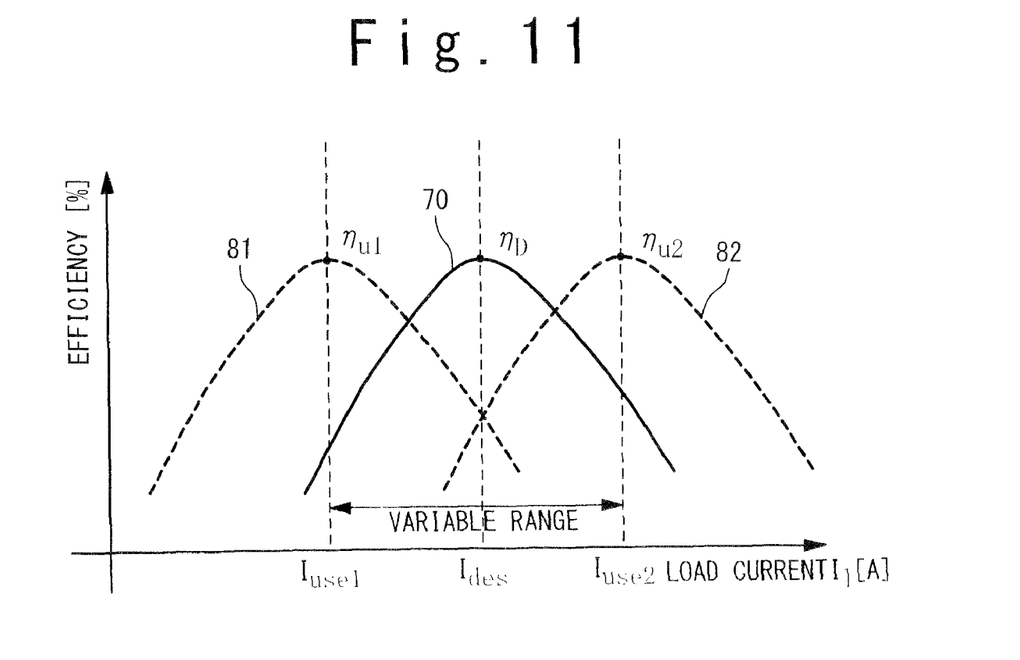
FIG. 11 is a characteristic diagram illustrating a variable load current corresponding to an optimum efficiency in the switching regulator according to the present embodiment.

As described above, according to the switching regulator 1 of the present embodiment, it is possible to set the MOS size (ON resistance value) that can achieve the optimum efficiency at the load current upon use. Even if a load current different from that envisaged at a design stage flows due to changes to specifications or the like, the MOS size can be set to achieve the optimum efficiency, and therefore an amount of power consumption at the time of the voltage conversion can be suppressed. FIG. 11 is an efficiency characteristic diagram showing a variable range of the load current at which the optimum efficiency can be obtained according to the present embodiment. In the present embodiment, a range from a load current $I_{use1}$ associated with the maximum value (efficiency $\eta_{u1}$) of an efficiency curve 81 in the case of the minimum MOS size to a load current $I_{use2}$ associated with the maximum value (efficiency $\eta_{u2}$) of an efficiency curve 82 in the case of the maximum MOS size is the variable range of the load current at which the optimum efficiency can be obtained. That is to say, according to the present embodiment, the MOS size can be changed to achieve the optimum efficiency even if the switching regulator 1 is used within the load current range from $I_{use1}$ to $I_{use2}$. Note that the MOS size may be changed at a manufacturing stage or during use as a product, depending on the usage of the switching regulator 1 (in-use load current $I_{use}$). If the MOS size is changed at the manufacturing stage, respective functions of the size setting section 2, the input current detecting section 3, the input voltage detecting section 4, the load current detecting section 5 and the output voltage detecting section 6 are preferably automatically performed with the use of a device such as a tester, but may be manually performed with an use of a multimeter or the like. On the other hand, if the MOS size is changed during use as the product, the respective functions of the size setting section 2, the input current detecting section 3, the input voltage detecting section 4, the load current detecting section 5 and the output voltage detecting section 6 are incorporated in the product as devices.

Figure 4:
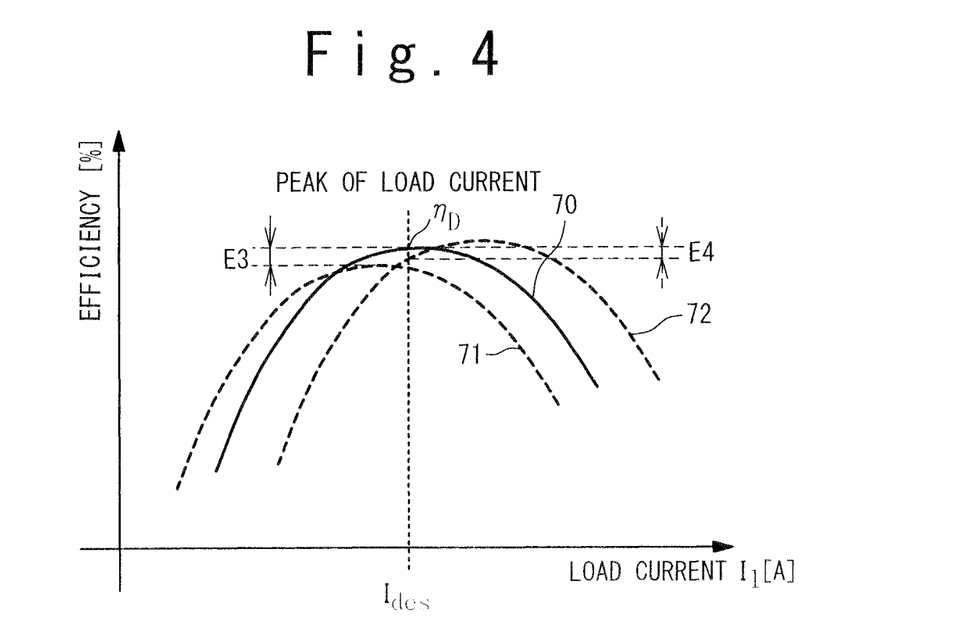
FIG. 4 is a characteristic diagram illustrating an efficiency characteristic depending on diffusion variability.

The ON resistance value of the MOS transistor varies depending also on diffusion variability or the like. According to the related technique, as shown in FIG. 4, the efficiency curve 70 (optimum efficiency $\eta_D$) envisaged at the design stage is shifted to an efficiency curve 71 or an efficiency curve 72 due to the diffusion variability. In this case, even if the load current $I_l$ is equal to the load current $I_{des}$ envisaged at the design stage, the efficiency is decreased by an error E3 or an error E4. On the other hand, according to the present embodiment, the efficiency is actually measured to adjust the MOS size to the optimum value. Therefore, the variation in efficiency due to the diffusion variability is also taken into account. For this reason, it is possible according to the present embodiment to correct the decrease in efficiency due to the diffusion variability.

Moreover, in the power supply apparatus described in Japanese Patent No. 3438330, the plurality of switches having the same characteristics or different characteristics are used to select the switch elements for voltage conversion. In this case, the switches are required as many as the number of voltages to be changed, resulting in an increase in circuit size. To incorporate into the IC a whole of the configuration excluding the coil and capacitor constituting the filter circuit, the number of switches (area) should be small. On the other hand, according to the present embodiment, the respective gate sizes W in the inverter circuit 15 are weighted in proportion to the powers of 2. Therefore, the MOS size can be changed to any of the $2^n-1$ different sizes when the number of the switch elements in the inverter circuit 15 is "n". That is to say, the ON resistance value can be changed to a large variety ($2^n-1$) of values by a small number (n) of switch elements. For this reason, an area of the IC chip on which the voltage conversion circuit 10 is formed can be made smaller as compared with that in the conventional technique. Also, the MOS size can be widely changed with accuracy by using the external device by simply providing the n pieces of external terminals 191 to 19n. Further, since the interval (step size) between the available MOS sizes is constant, the size change can be easily controlled.

Furthermore, according to the present embodiment, the efficiency is measured and then the MOS size (ON resistance value) is adjusted on the basis of the result of the measurement. It is thus possible to improve the efficiency without modifying parameters of the coil and capacitor in the filter circuit 20 provided outside the IC chip.

As above, the embodiments of the present invention have been described in detail. It is apparent that the present invention is not limited to the above embodiments and may be modified and changed without departing from the scope and spirit of the invention. The switching regulator of the present invention has been described by taking a synchronous rectification type step-down DC-DC converter as an example, but may also be applied to any of a step-up type and a step-up/down type DC-DC converters in addition to the step-down type DC-DC converter. Also, the size setting section 2 for generating the setting signal 105 may be realized by software. In such a case, the size setting section 2 and the size adjustment circuit 16 can be incorporated in the same IC chip.

What is claimed is:

1. A method of converting a DC voltage comprising:
    setting an ON resistance of a switch circuit depending on a power efficiency that is calculated from an input power dependent on an input voltage and an output power dependent on an output voltage; and
    converting said input voltage into said output voltage by a switching operation of said switch circuit,
    wherein the setting of the ON resistance includes:
    calculating a first power efficiency by setting said ON resistance of said switch circuit to a first value;
    calculating a second power efficiency by setting said ON resistance of said switch circuit to a second value different from said first value; and
    setting said ON resistance of said switch circuit to said first value upon said first power efficiency being higher than said second power efficiency.

2. The method according to claim 1,
    wherein the calculating of each of the first power efficiency and the second power efficiency includes:
    measuring a load current flowing through a load circuit to which said output voltage is output; and
    calculating said each power efficiency at said load current.

3. The method according to claim 1,
    wherein the calculating of each of the first power efficiency and the second power efficiency includes:
    selecting a selected number of switch element among a plurality of switch elements included in said switch circuit;
    converting said input voltage into said output voltage by a switching operation of said selected number of switch element; and
    calculating said each power efficiency from an input power dependent on said input voltage and an output power dependent on said output voltage.

4. A DC voltage converting apparatus comprising:
    an inverter circuit configured to convert an input voltage into an output voltage by a switching operation of a switch circuit;
    a size setting section configured to calculate a power efficiency from an input power dependent on said input voltage and an output power dependent on said output voltage while changing an ON resistance of said switch circuit, to determine said ON resistance of said switch circuit based on said calculated power efficiency, and to output a size setting signal corresponding to said determined ON resistance; and
    a size adjustment circuit configured to control said ON resistance of said switch circuit depending on said size setting signal.

5. The DC voltage converting apparatus according to claim 4, wherein said size setting section calculates a first power efficiency as said power efficiency by setting said ON resistance of said switch circuit to a first value, calculates a second power efficiency as said power efficiency by setting said ON resistance of said switch circuit to a second value different from said first value, and determines said ON resistance of said switch circuit to said first value upon said first power efficiency being higher than said second power efficiency.

* * * * *